United States Patent [19]

Sakurai

[11] 3,852,733

[45] Dec. 3, 1974

[54] BREAKAGE DETECTOR FOR AUTOMOTIVE LAMP CIRCUITS

[75] Inventor: Yasuhiko Sakurai, Kariya, Japan

[73] Assignee: Nippondenso Co., Ltd., Kariya-shi, Aichi-ken, Japan

[22] Filed: Oct. 4, 1973

[21] Appl. No.: 403,610

[30] Foreign Application Priority Data
Oct. 6, 1972  Japan............................. 47-100882

[52] U.S. Cl................... 340/251, 315/130, 324/51, 340/80
[51] Int. Cl. .......................................... H05b 37/03
[58] Field of Search ........ 324/51; 340/251, 256, 80; 315/82, 83, 129, 130, 133, 136

[56] References Cited
UNITED STATES PATENTS

| | | | |
|---|---|---|---|
| 3,541,506 | 11/1970 | Motoyasu et al. | 340/251 X |
| 3,623,055 | 11/1971 | Sakurai | 340/251 |
| 3,636,511 | 1/1972 | Sakurai | 340/251 X |
| 3,641,490 | 2/1972 | Kawai | 340/251 X |
| 3,644,886 | 2/1972 | Sabaroff | 340/251 X |

Primary Examiner—Gerard R. Strecker
Attorney, Agent, or Firm—Cushman, Darby & Cushman

[57] ABSTRACT

A breakage detector for an automotive lamp circuit having a plurality of parallel autmotive lamps such as brake lamps, tail lamps and a number lamp. The breakage detector comprises a plurality of burn-out detection relays individually provided for the respective automotive lamps and each consisting of a voltage coil, a current coil and a normally open switch adapted to be closed when either the current coil or voltage coil is energized. Each current coil is connected in series with the associated automotive lamp, and in the "on" state of a lamp switch current from a power supply is caused to pass through the current coil to the associated lamp. Even in the "off" state of the lamp switch, if the automotive key switch is "on" a minute current is caused from the power supply through each voltage coil to the associated lamp. The normally open switches of the respective relays are connected such as to form a series circuit. An indicator is controlled according to whether the series circuit is closed or open so as to indicate the accidental burn-out of any automotive lamp.

2 Claims, 4 Drawing Figures

BREAKAGE DETECTOR FOR AUTOMOTIVE LAMP CIRCUITS

BACKGROUND OF THE INVENTION

1. Field of the Invention

This invention relates to breakage detector for checking the accidental burn-out of automotive lamps such as brake lamps, tail lamps and number lamps.

2. Description of the Prior Art

In the prior art circuit of this kind, automotive lamps are connected in parallel and their current level is detected through a suitable detecting means for checking if there is any burnt-out lamp. Therefore, the detection of the accidental burn-out of lamps is permitted only in the "on" state of the lamps and not in the "off" state of the lamps.

SUMMARY OF THE INVENTION

The present invention has for its object the provision of a breakage detector for automotive lamp circuits, which has means to detect the load current in each lamp when the lamps are "on" and also means to cause and detect a minute current in each lamp even in the "off" state of the lamps in the running state of the vehicle (with the key switch closed), thereby always permitting a watch to be kept on the state of the lamps.

Another object of the invention is to provide the aforementioned breakage detector, which is further provided with a checking means for checking the whole breakage detector so that it has high reliability and can discriminate the state of an indicator lamp, a fuse and itself as well as the automotive lamps.

According to the invention, burn-out detection relays each consisting of a voltage coil, a current coil and a normally open switch are provided for respective automotive lamps, each normally open switch being closed by the associated voltage coil means in the "off" state of a lamp switch for turning on the lamps and by the associated current coil means in the "on" state of the lamp switch, thereby enabling detection of the burn-out of any lamp. Thus, the detection of the accidental burn-out of any lamp can be effected irrespective of whether the lamp switch for turning on the lamps is "on" or "off."

Also according to the invention, the normally open switches of the burn-out detection relays are connected in series with each other for detecting the burn-out from the state of the series circuit, so that it is possible to provide a construction such that in the checking operation power can be supplied to an indicator through the series circuit of the normally open switches which are closed when the associated lamps are normal. Thus, it is possible to provide a versatile breakage detector where the overall state inclusive of the state of lamps and indicators can be checked in the checking operation.

Further, according to the invention power is supplied to the burn-out detection relays for the lamps through a lamp source circuit, while power for the drive means for the indicator is supplied through a separate circuit including the key switch, so that it is possible to detect both the burn-out of the lamps and the breakage of the fuse in the lamp circuit.

DESCRIPTION OF THE PREFERRED EMBODIMENT

Figure 1:
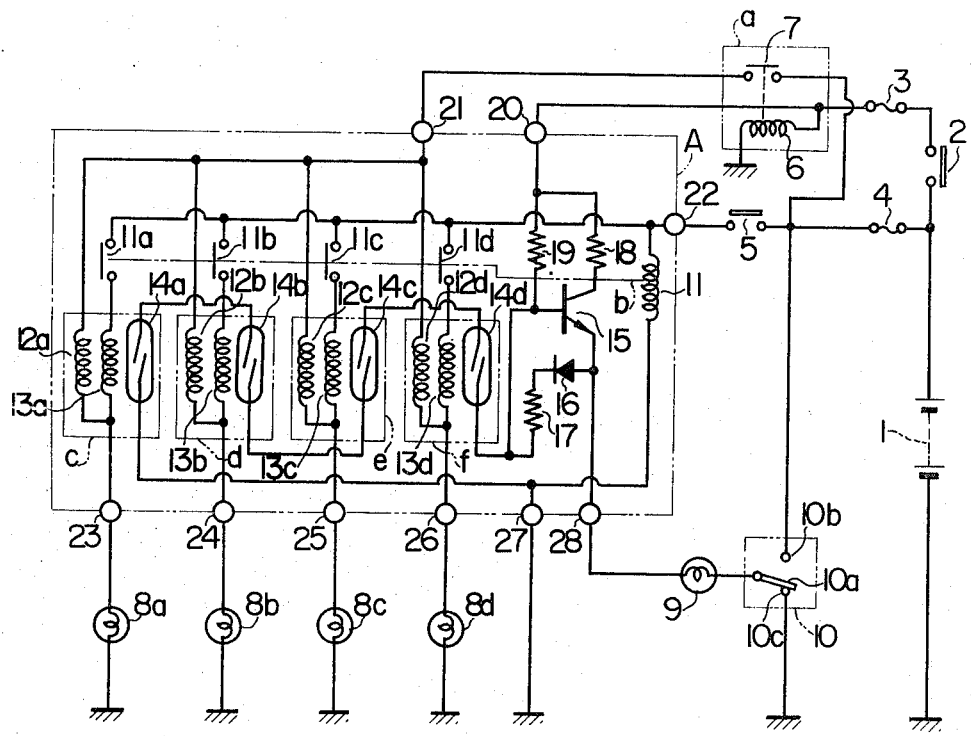
FIG. 1 is a connection diagram showing an embodiment of the invention.

An embodiment of the invention will now be described in connection with the drawing. Referring to FIG. 1, reference numeral 1 designates a power supply battery provided in a vehicle, numeral 2 a key switch, numerals 3 and 4 fuses, and numeral 5 a lamp switch. Numeral 6 designates a voltage coil constituting a relay $a$ together with a normally open switch 7. Symbols 8$a$, 8$b$, 8$c$ and 8$d$ designate lamps such as brake light and tail light of the vehicle. Numeral 9 designates a burnt-out indicator lamp, and numeral 10 a check switch having a pole 10$a$, a normally open fixed contact 10$b$ and a normally closed fixed contact 10$c$.

The breakage detector means according to the invention is generally indicated at A and is to be described hereinafter. Numeral 11 designates a voltage coil for driving normally open switches 11$a$, 11$b$, 11$c$ and 11$d$, and it constitutes a relay $b$. The switches 11$a$, 11$b$, 11$c$ and 11$d$ and the voltage coil 11 are commonly connected at their one end to the switch 5 on the side thereof opposite the power supply. The other end of the voltage coil 11 is connected to earth, and the normally open switches 11$a$, 11$b$, 11$c$ and 11$d$ have their other end connected to the respective lamps 8$a$, 8$b$, 8$c$ and 8$d$. Symbols 12$a$, 12$b$, 12$c$ and 12$d$ designate voltage coils having their one end commonly connected to the normally open switch 7 side thereof opposite the power supply and their other end to the respective lamps 8$a$, 8$b$, 8$c$ and 8$d$. Symbols 13$a$, 13$b$, 13$c$ and 13$d$ designate current coils associating with the respective voltage coils 12$a$, 12$b$, 12$c$ and 12$d$ and are inserted between the respective normally open switches 11$a$, 11$b$, 11$c$ and 11$d$ and the associated lamps 8$a$, 8$b$, 8$c$ and 8$d$. Numerals 14$a$, 14$b$, 14$c$ and 14$d$ designate reed switches individually having normally open contacts and adapted to be closed by the magnetomotive force of the respective voltage coils 12$a$, 12$b$, 12$c$ and 12$d$ or current coils 13$a$, 13$b$, 13$c$ and 13$d$. Symbols $c$, $d$, $e$ and $f$ designate burn-out detection relays each consisting of a voltage coil, a current coil and a reed switch. The reed switches 14$a$, 14$b$, 14$c$ and 14$d$ are connected in series with each other, and the series circuit is connected at one end to earth through a terminal 27 and at the other end to the base of an n-p-n transistor 15 and a resistor 17. Numeral 16 designates a diode having its cathode connected through the resistor 17 to the series circuit of the reed switches 14$a$, 14$b$, 14$c$ and 14$d$ and its anode connected to one end of the indicator lamp 9 together with the emitter of the transistor 15. Numerals 18 and 19 respectively designate collector resistor and base resistor for the transistor 15, and numerals 20 to 26 and 28 designate terminals of the breakage detector means.

The operation of the above construction embodying the invention will now be described. When the key switch 2 is closed for driving the vehicle, the voltage coil 6 of the relay $a$ is energized to close the normally open switch 7, whereby power is supplied through the fuse 4 and voltage coils 12$a$, 12$b$, 12$c$ and 12$d$ to the lamps 8a, 8b, 8c and 8d. At this time, if the lamps 8a, 8b, 8c and 8d connected to the respective voltage coils 12a, 12b, 12c and 12d are normal, the voltage coils 12a, 12b, 12c and 12d are energized to close the reed switches 14a, 14b, 14c and 14d. At this time, the current flowing in the voltage coils 12a, 12b, 12c and 12d is small compared to the current required for turning on the lamps 8a, 8b, 8c and 8d, so that the lamps 8a, 8b, 8c and 8d are not turned on. If any one of the lamps 8a, 8b, 8c and 8d, for instance lamp 8a, is burnt-out, the corresponding reed switch, namely switch 14a, is not closed but remains open, so that the series circuit of the reed switches 14a, 14b, 14c and 14d remains open.

When the switch 5 is closed for turning on the lamps 8a, 8b, 8c and 8d, the voltage coil 11 is energized to close the normally open switches 11a, 11b, 11c and 11d, whereby the lamps 8a, 8b, 8c and 8d are turned on. Also, at this time the current coils 13a, 13b, 13c and 13d are energized with the load current flowing in the respective lamps 8a, 8b, 8c and 8d. At this time, the source voltage appears at the terminal of the voltage coils 12a, 12b, 12c and 12d on the side of the respective lamps 8a, 8b, 8c and 8d. In other words, the potentials on the opposite terminals of each of the voltage coils 12a, 12b, 12c and 12d become equal, so that the voltage coils 12a, 12b , 12c and 12d are not energized. Thus, when the lamps 8a, 8b, 8c and 8d are turned on, the reed switches 14a, 14b, 14c and 14d are closed by the current coils 13a, 13b, 13c and 13d. It will thus be understood that if any one of the lamps 8a, 8b, 8c and 8d is burnt-out, the corresponding reed switch remains open even at the time of turning on the lamps 8a to 8d, so that the series circuit of the reed switches 14a, 14b, 14c and 14d remains open. In other words, with the construction of FIG. 1 embodying the invention the series circuit of the reed switches 14a, 14b, 14c and 14d is closed only if all the lamps 8a to 8d are normal either when the lamps are turned on or when they are not, the series circuit remaining open if any one of the lamps 8a to 8d is burnt-out, so that it is possible to keep watch on the accidental burn-out of the lamps. The indicator lamp 9 is provided for detection of the accidental burn-out of the lamps 8a to 8d, and the switch 10 is provided for checking the whole breakage detector means including the indicator lamp 9. The check switch 10 has its normally closed contact 10c connected to earth and its normally open contact 10b connected to the connection between fuse 4 and switch 5. The check switch may, for instance, be interlocked to a starter switch not shown so that it may be operated before the start of the vehicle. Alternatively, it may be automatically operated by a time-limit drive means not shown actuated in response to the closure of the key switch 2, or it may have a manually operable and self-returning construction.

By throwing the pole 10a of the check switch 10 into contact with the normally open contact 10b in any of the afore-mentioned ways, if all the lamps 8a to 8d are normal and all the reed switches 14a to 14d are closed, ground potential appears at the base of the transistor 15, so that the transistor 15 is cut off, while at the same time the cathode of the diode 16 is connected to earth through the resistor 17, permitting current from power supply through fuse 4, switch 10, indicator lamp 9, diode 16, resistor 17 and reed switches 14a, 14b, 14c and 14d to earth, whereby the indicator lamp 9 is turned on. The resistance of the resistor 17 is set to be sufficiently low lest the turning-on of the indicator lamp 9 should be prevented. However, if any one of the lamps 8a to 8d is burnt out, the series circuit of the reed switches 14a to 14d remains open, so that the indicator lamp 9 will not be turned on.

Even in the closed state of the series circuit of the reed switches 14a, 14b, 14c and 14d with all the lamps 8a, 8b, 8c and 8d being normal, the indicator lamp 9 will not be turned on if the indicator lamp 9 itself is burnt out or closure of the check switch 10 is prevented or the fuse 4 is burnt out. Thus, in the checking operation the normal state of the breakage detector circuit as a whole is indicated by the turning-on of the indicator lamp 9 while the "off" state of the indicator lamp 9 indicates that there is a trouble in the lamp 8a, 8b, 8c or 8d, indicator lamp 9, breakage detector means A, check switch 10 or fuse 4. Thus, the whole breakage detector can be checked. When the checking operation is released by throwing the pole 10a of the check switch 10 to the side of the normally closed contact 10c, one end of the indicator lamp 9 is grounded, thus forming a circuit where power is supplied through transistor 15 into the indicator lamp 9. In this state, if all the lamps 8a to 8d are normal so that the series circuit of the reed switches 14a to 14d is closed, the base of the transistor 15 is grounded so that the transistor 15 is rendered non-conductive. As a result, no power is supplied to the indicator lamp 9, so that the indicator lamp 9 is not turned on. However, if at least any one of the lamps 8a, 8b, 8c and 8d is burnt out, the series circuit of the reed switches 14a to 14d remains open, so that the base of the transistor 15 is not grounded. This means that base current flows into the transistor 15 through the resistor 19, so that the transistor 15 is rendered conductive to turn on the indicator lamp 9. The resistance of the resistor 18 is set to be sufficiently low lest the turning-on of the indicator lamp 9 should be prevented. It is to be understood that in the running state of the vehicle after the releasing of the checking operation, the "off" state of the indicator lamp 9 indicates that the lamps 8a to 8d are all normal, while the "on" state of the indicator lamp 9 indicates that at least one of the lamps 8a to 8d is burnt out.

In the preceding embodiment of FIG. 1, the lamps 8a, 8b, 8c and 8d are individually energized through the respective normally open switches 11a, 11b, 11c and 11d adapted to be closed by the voltage coil 11. In an alternative construction as shown in FIG. 2, the coil 11 and normally open switches 11a, 11b, 11c and 11d are replaced with forwardly connected diodes 11a', 11b', 11c' and 11d'.

Figure 2:
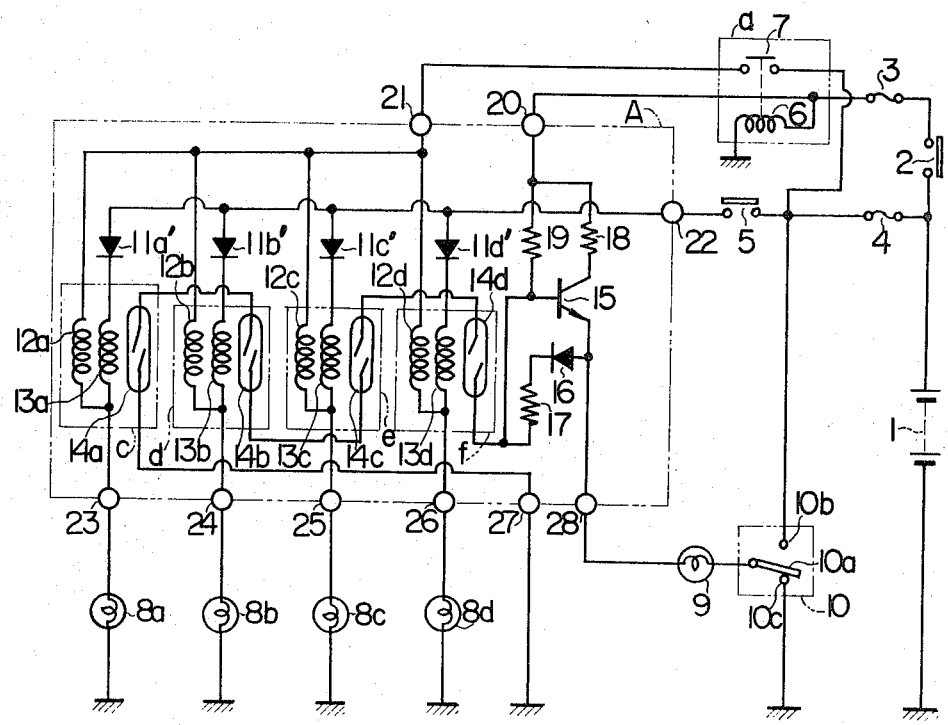
FIG. 2 is a connection diagram showing another embodiment of the invention.

While four lamps are provided in the preceding embodiments of FIGS. 1 and 2, the number of the lamps can of course be changed by appropriately changing the number of elements indicated by symbols with a subscript a, b, c, d, . . . , or the number of burn-out detection relays c, d, e, f, . . . .

Also, while in the preceding embodiments the burn-out detection relays c, d, e and f have been reed relays having the reed switches 14a, 14b, 14c and 14d, it is of course possible to use electromagnetic relays having ordinary, normally open switches in place of the reed switches. Further, the indicator lamp 9 is only a suitable example of the indicating means, and it may be replaced with a buzzer or other indicating means. Furthermore, the relay a controlled by the key switch 2 may be replaced with a switch mechanically interlocked to the key switch 2. Still further, it is possible to omit the relay $a$ and directly connect one end of the voltage coils of the burn-out detection relays to the power supply 1 through the fuse 3 and key switch 2.

I claim:

1. A breakage detector for an automotive lamp circuit having a plurality of lamps, a key switch, a lamp switch, a relay switch means for turning on said lamps when said lamp switch is closed and a power supply, comprising:
 - a plurality of relays each including a current coil connected in series with an associated one of said lamps and said relay switch means, a voltage coil connected to said power supply as to be energized through said lamp when said key switch is closed, and a normally open switch adapted to be closed when either said current coil or said voltage coil is energized;
 - a series circuit made of said normally open switches of said individual relays connected in series;
 - a detecting means connected to said series circuit for detecting the state of said normally open switches of said relays; and
 - an indicating means connected to said detecting means and producing an alarm when any one of said normally open switches is open.

2. The breakage detector according to claim 1, which further comprises a check switch connected to said series circuit through said indicating means and to said power supply.

* * * * *